(12) United States Patent
Shirao et al.

(10) Patent No.: US 8,607,919 B2
(45) Date of Patent: Dec. 17, 2013

(54) WORKING VEHICLE AND METHOD FOR CONTROLLING A WORKING VEHICLE

(75) Inventors: Atsushi Shirao, Komatsu (JP); Hidehiro Hashimoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/809,514

(22) PCT Filed: May 9, 2012

(86) PCT No.: PCT/JP2012/061880
§ 371 (c)(1),
(2), (4) Date: Jan. 10, 2013

(65) Prior Publication Data
US 2013/0259710 A1      Oct. 3, 2013

(30) Foreign Application Priority Data
Mar. 30, 2012   (JP) .................................. 2012-078940

(51) Int. Cl.
*B60K 17/00*   (2006.01)
(52) U.S. Cl.
USPC ......................................... 180/307; 180/367
(58) Field of Classification Search
USPC ................ 180/305, 306, 307, 367; 701/50
See application file for complete search history.

(56) References Cited

U.S. PATENT DOCUMENTS

| 3,866,700 A * | 2/1975 | Bauer ........................... 180/6.48 |
| 3,981,374 A * | 9/1976 | Johns, Jr. ....................... 180/14.3 |
| 4,240,515 A * | 12/1980 | Kirkwood ...................... 180/165 |
| 6,564,548 B2 * | 5/2003 | Nishimura et al. ............. 60/431 |
| 6,938,719 B2 * | 9/2005 | Ishimaru et al. ............... 180/305 |
| 7,987,941 B2 * | 8/2011 | Shirao et al. ................... 180/307 |
| 8,386,136 B2 * | 2/2013 | Shirao et al. .................... 701/50 |
| 2010/0089051 A1 * | 4/2010 | Ohtsukasa ..................... 60/451 |

FOREIGN PATENT DOCUMENTS

| JP | 2-275177 A | 11/1990 |
| JP | 2004-144254 A | 5/2004 |
| JP | 2011-52793 A | 3/2011 |
| WO | WO 2008/090761 A1 | 7/2008 |

* cited by examiner

*Primary Examiner* — John Walters
*Assistant Examiner* — Brian Swenson
(74) *Attorney, Agent, or Firm* — Global IP Counselors, LLP

(57) ABSTRACT

An upper limit speed control part controls the lower limit of motor displacement in conformance with the target upper limit speed via a motor displacement control part when the target upper limit speed is within the normal speed range. The upper limit speed control part controls the upper limit of pilot pressure via a pilot pressure control part in conformance with the target upper limit speed when the target upper limit speed is within the low speed range. Further, when the target upper limit speed is within the low speed range, the upper limit speed control part controls a pilot pressure valve such that the upper limit of pilot pressure increases as drive circuit pressure increases.

6 Claims, 10 Drawing Sheets

WORKING VEHICLE AND METHOD FOR CONTROLLING A WORKING VEHICLE

CROSS-REFERENCE TO RELATED APPLICATIONS

This application claims priority to Japanese Patent Application No. 2012-078940 filed on Mar. 30, 2012, the disclosure of which is hereby incorporated herein by reference in its entirety.

TECHNICAL FIELD

The present invention is related to a working vehicle and a method for controlling a working vehicle.

BACKGROUND ART

Among working vehicles there are those mounted with what is called HST (Hydro Static Transmission). In an HST type working vehicle an engine drives a hydraulic pump and a traveling hydraulic motor is driven by hydraulic fluid discharged from a hydraulic pump. This is how the working vehicle is made to travel. In an HST type working vehicle, vehicle speed and tractive force can be controlled by controlling engine rotation speed, pump displacement of the hydraulic pump and motor displacement of the traveling hydraulic motor and the like. (See, Japan Patent Laid-open Patent Publication JP-A-2004-144254).

The working vehicle as described above can perform an upper limit speed variable control. The upper limit speed variable control is a control that limits the upper limit of vehicle speed to a speed that is lower than maximum vehicle speed. With such upper limit speed variable control the lower limit of motor displacement is limited to be a larger lower limit displacement than minimum displacement. In this way, upper limit vehicle speed is reduced to be below maximum vehicle speed. Further, the upper limit of vehicle speed is reduced as the lower limit of motor displacement is increased. In this way, an operator can freely set the upper limit vehicle speed at the desired speed.

SUMMARY

In the case of the upper limit speed variable control as described above, the upper limit of vehicle speed is lowered as the lower limit of motor displacement is made to increase. Accordingly, when the lower limit of motor displacement reaches the maximum displacement, it is no longer possible to further lower the upper limit of vehicle speed. In a conventional working vehicle an inching pedal is operated to further reduce vehicle speed upper limit. When the inching pedal is operated, pilot pressure to a pump displacement control cylinder that controls the tilting angle of a hydraulic pump is lowered in conformance with the degree of downward step on the inching pedal. The pump displacement is lowered in this way. This enables vehicle speed to be lowered.

However, when vehicle speed is adjusted by operating the inching pedal, the operator must accurately adjust the degree of downward step on the inching pedal to the amount that provides the desired speed. Further, a problem arises as When pilot pressure is lowered by operating the inching pedal drive circuit pressure becomes smaller. In FIG. 4 L11-L18 show the change in characteristics of pump displacement to drive circuit pressure in conformance with pilot pressure to the pump displacement control cylinder. The pump displacement to drive circuit pressure characteristics change from L11 toward L18 as pilot pressure becomes smaller. In other words, the characteristics of pump displacement to drive circuit pressure change such that pump displacement in relation to drive circuit pressure becomes smaller as pilot pressure becomes smaller. The pump displacement is reduced in this way. However as shown in FIG. 4 as the pump displacement to drive circuit pressure characteristics change from L11 toward L18, the upper limit of drive circuit pressure decreases. As drive circuit pressure decreases, the tractive force of the vehicle decreases. In this case, vehicle speed decreases more easily as load increases. If the load increases when vehicle speed is within the low speed range, there is a possibility that the vehicle may stop completely.

Accordingly when the operator reduces vehicle speed using the inching pedal in order to achieve the desired speed, in addition to accurately adjusting the degree of downward step on the inching pedal the operator must operate the inching pedal such that the vehicle does not stop due to increase in load. Such operation requires highly skilled operator and is not easy.

It is an object of the present invention to provide a working vehicle and a method for controlling a working vehicle that enables the upper limit of vehicle speed to be limited with ease within the low speed range and suppresses decrease in tractive force.

A working vehicle according to a first aspect of the present invention includes an engine, a hydraulic pump, a traveling hydraulic motor, a pump displacement control cylinder, a pilot hydraulic source, a pilot pressure control valve, a motor displacement control part, a drive circuit pressure detection part, an upper limit speed setting part, a speed range determination part, and an upper limit speed control part. The hydraulic pump is driven by the engine. The traveling hydraulic motor is driven by hydraulic fluid discharged from the hydraulic pump. The pump displacement control cylinder changes the pump displacement of the hydraulic pump by changing the tilting angle of the hydraulic pump. The pilot hydraulic source supplies hydraulic fluid for driving the pump displacement control cylinder. The pilot pressure control valve controls pilot pressure. Pilot pressure is the pressure of hydraulic fluid supplied to the pump displacement control cylinder from the pilot hydraulic source. The motor displacement control part changes motor displacement of the traveling hydraulic motor by changing the tilting angle of the traveling hydraulic motor. The drive circuit pressure detection part detects drive circuit pressure. Drive circuit pressure is the pressure of hydraulic fluid supplied to the traveling hydraulic motor. The upper limit speed setting part sets the target upper limit speed for upper limit speed variable control that limits the upper limit of vehicle speed to a speed lower than maximum vehicle speed. The speed range determination part determines if the target upper limit speed is within normal speed range, or within low speed range. Normal speed range is a range of speed within which the upper limit of vehicle speed can be changed by changing the lower limit of motor displacement between minimum displacement and maximum displacement. Low speed range is a range of speed lower than normal speed range. The upper limit speed control part controls the lower limit of motor displacement in conformance with the target upper limit speed through the motor displacement control part when the target upper limit speed is within the normal speed range. The upper limit speed control part controls the upper limit of pilot pressure in conformance with the target upper limit speed through the pilot pressure control valve when target upper limit speed is within the low speed range. When the target upper limit speed is within low speed range, the upper limit speed control part controls the pilot pressure control valve such that the upper limit of pilot pressure increases as drive circuit pressure increases.

A working vehicle according to a second aspect of the present invention is the working vehicle according to the first aspect in which the upper limit speed control part controls the pilot pressure control valve such that the upper limit of pilot pressure increases as the target upper limit speed increases.

A working vehicle according to a third aspect of the present invention is the working vehicle according to the first aspect in which the upper limit speed control part does not limit the upper limit of pilot pressure in conformance with a target upper limit speed when the target upper limit speed is within the normal speed range.

A working vehicle according to a fourth aspect of the present invention is the working vehicle according to any of the first through third aspects, in which when pilot pressure is fixed at a predetermined pilot pressure value, pump displacement and drive circuit pressure change in accordance with first pump displacement to drive circuit pressure characteristics that defines the relationship of pump displacement to drive circuit pressure. When target upper limit speed is within the low speed range, the upper limit speed control part changes the upper limit of pilot pressure in conformance with drive circuit pressure, such that pump displacement and drive circuit pressure change in accordance with second pump displacement to drive circuit pressure characteristics. The absolute value of the ratio of change of drive circuit pressure in relation to pump displacement defining second pump displacement to drive circuit pressure characteristics is greater than the absolute value of the change ratio of drive circuit pressure in relation to pump displacement defining first pump displacement to drive circuit pressure characteristics.

A working vehicle according to a fifth aspect of the present invention is the working vehicle according to the fourth aspect in which, when the target upper limit speed is within the low speed range, the upper limit speed control part sets the upper limit of pilot pressure to a value smaller than a predetermined first pilot pressure. The first pilot pressure is pilot pressure at which pump displacement when drive circuit pressure is at the pressure of load equivalent when traveling on a level surface reaches maximum displacement of the hydraulic pump, that is pilot pressure that obtains first pump displacement to drive circuit pressure characteristics in which if drive circuit pressure becomes greater than the pressure of load equivalent when traveling on a level surface, pump displacement becomes less than maximum displacement of the hydraulic pump.

A control method according to a sixth aspect of the present invention is a control method for a working vehicle. The working vehicle includes an engine, a hydraulic pump, a traveling hydraulic motor, a pump displacement control cylinder, a pilot hydraulic source, a pilot pressure control valve, a motor displacement control part, a drive circuit pressure detection part, an upper limit speed setting part. The hydraulic pump is driven by the engine. The traveling hydraulic motor is driven by hydraulic fluid discharged from the hydraulic pump. The pump displacement control cylinder changes the pump displacement of the hydraulic pump by changing the tilting angle of the hydraulic pump. The pilot hydraulic source supplies hydraulic fluid for driving the pump displacement control cylinder. The pilot pressure control valve controls pilot pressure. Pilot pressure is the pressure of hydraulic fluid supplied to the pump displacement control cylinder from the pilot hydraulic source. The motor displacement control part changes motor displacement of the traveling hydraulic motor by changing the tilting angle of the traveling hydraulic motor. The drive circuit pressure detection part detects drive circuit pressure. Drive circuit pressure is the pressure of hydraulic fluid supplied to the traveling hydraulic motor. The upper limit speed setting part sets the target upper limit speed for upper limit speed variable control that limits the upper limit of vehicle speed to a speed lower than maximum vehicle speed. The control method according to this aspect comprises the following steps. At a first step, a determination is made of whether the target upper limit speed is within the normal speed range or within the low speed range. Normal speed range is a range of speed within which the upper limit of vehicle speed can be changed by changing the lower limit of motor displacement between minimum displacement and maximum displacement. Low speed range is a range of speed lower than normal speed range. At a second step the lower limit of motor displacement is controlled in conformance with the target upper limit speed by the motor displacement control part when the target upper limit speed is within normal speed range. At a third step the upper limit of pilot pressure is controlled in conformance with the target upper limit speed by the pilot pressure control valve when target upper limit speed is within the low speed range. Further, at the third step, the pilot pressure control valve is controlled such that the upper limit of pilot pressure increases as drive circuit pressure increases.

In the working vehicle according to the first aspect of the present invention the upper limit speed control part controls the upper limit of pilot pressure in conformance with a target upper limit speed when the target upper limit speed is within the low speed range. In this way even for the low speed range in which the upper limit of vehicle speed cannot be changed by control of motor displacement, the upper limit of vehicle speed can be changed. Accordingly, limits on the upper limit of vehicle speed can easily be changed in the low speed range without operation of an inching pedal as in the case of a conventional working vehicle. Again, when the target upper limit speed is within the low speed range, the upper limit speed control part controls the pilot pressure control valve such that the upper limit of pilot pressure increases as drive circuit pressure increases. Thus in comparison to the case in which the upper limit of pilot pressure is fixed at a predetermined value in relation to a predetermined target upper limit speed, a decrease in drive circuit pressure can be prevented. Accordingly, a decrease in tractive force during upper limit speed variable control in the low speed range can be prevented.

In the working vehicle according to the second aspect of the present invention the upper limit speed control part increases the upper limit of vehicle speed by increasing the upper limit of pilot pressure. In this way the upper limit of vehicle speed can be set at a target upper limit speed set by the upper limit speed setting part.

In the working vehicle according to the third aspect of the present invention, during upper limit speed variable control in the normal speed range, the upper limit of pilot pressure is not limited. Thus upper limit speed variable control can be accurately performed.

In the working vehicle according to the fourth aspect of the present invention, for upper limit speed variable control in the low speed range, the upper limit speed control part changes the upper limit of pilot pressure in conformance with drive circuit pressure such that pump displacement and drive circuit pressure change in accordance with second pump displacement to drive circuit pressure characteristics. The ratio of change of drive circuit pressure in relation to pump displacement by the first pump displacement to drive circuit pressure characteristics is a constant value determined by the mechanical structure of the working vehicle. Accordingly during operation of the working vehicle changing the change ratio is practically impossible. Thus, in the case of this aspect of the working vehicle, it is apparent that the upper limit of pilot pressure is changed in conformance with drive circuit pressure such that pump displacement and drive circuit pressure change following the second pump displacement to drive circuit pressure characteristics the absolute value of the ratio of change of which is greater than that of the first pump displacement to drive circuit pressure characteristics. In this way, during upper limit speed variable control in the low speed range decrease in tractive force can be prevented.

In the control method for a working vehicle according to the fifth aspect of the present invention, when the target upper limit speed is within the low speed range, the upper limit of pilot pressure is controlled in conformance with the target upper limit speed. In this way, even in the low speed range in which the upper limit of vehicle speed cannot be changed by control of motor displacement, the upper limit of vehicle speed can be changed. Accordingly, limit on the upper limit of vehicle speed can easily be changed in the low speed range without operation of an inching pedal as in the case of a conventional working vehicle. Again, when the target upper limit speed is within the low speed range, the pilot pressure control valve is controlled such that the upper limit of pilot pressure increases as drive circuit pressure increases. Thus in comparison to the case in which the upper limit of pilot pressure is set at a predetermined value in relation to a predetermined target upper limit speed, a decrease in drive circuit pressure can be prevented. Accordingly, a decrease in tractive force during upper limit speed variable control in the low speed range can be prevented.

DESCRIPTION OF EMBODIMENTS

Figure 1:
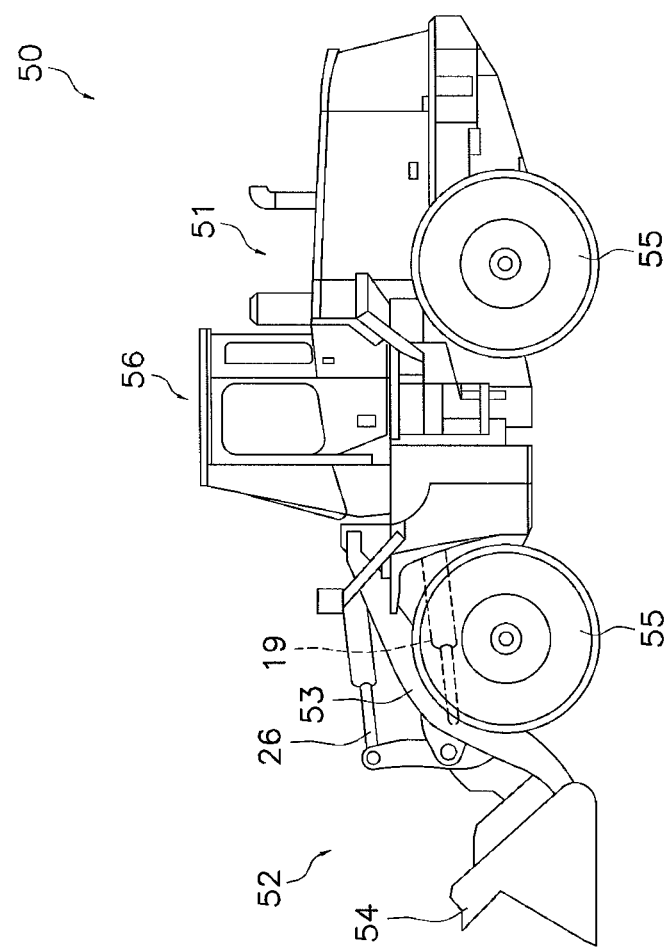
FIG. 1 is a side view of a working vehicle according to an embodiment of the present invention.

A working vehicle 50 according to a first embodiment of the present invention will now be described with reference to the drawings. FIG. 1 is a side view of the working vehicle 50. The working vehicle 50 is a wheel loader. The working vehicle 50 includes a body 51, a working implement 52, a plurality of tires 55, and a cab 56. The working implement 52 is installed at the front part of the body 51. The working implement 52 has a boom 53, a bucket 54, a lift cylinder 19 and a bucket cylinder 26. The boom 53 is a member used for lifting the bucket 54. The boom 53 is driven by the lift cylinder 19. The bucket 54 is attached at the end of the boom 53. The bucket 54 can be made to dump or tilt by the bucket cylinder 26. The cab 56 is placed in position over the body 51.

Figure 2:
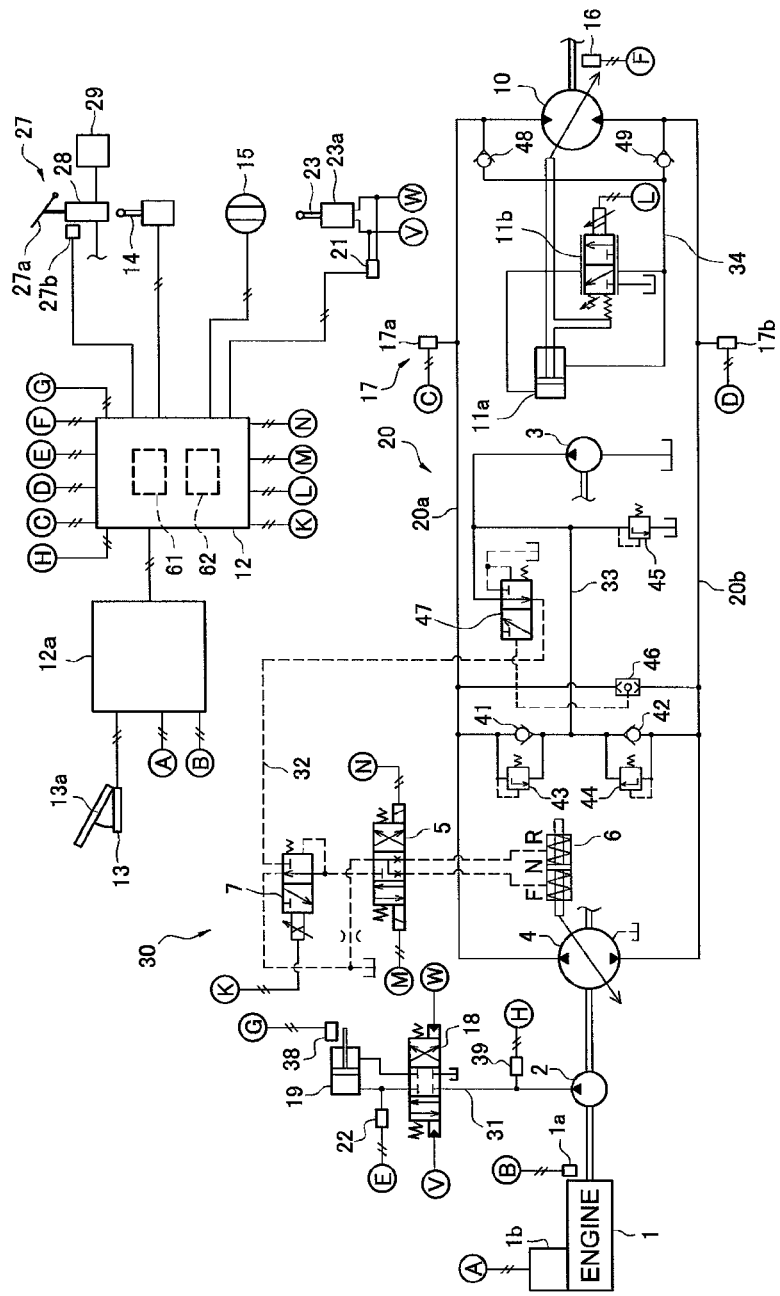
FIG. 2 is a block diagram of the configuration of the hydraulic driving mechanism mounted on the working vehicle.

FIG. 2 is a block diagram of the configuration of the hydraulic driving mechanism 30 mounted on the working vehicle 50. The hydraulic drive mechanism 30 includes chiefly, an engine 1, a first hydraulic pump 4, a second hydraulic pump 2, a charge pump 3, a traveling hydraulic motor 10, an engine controller 12a, a vehicle body controller 12 and a drive hydraulic circuit 20. In the hydraulic drive mechanism 30, the first hydraulic pump 4 discharges hydraulic fluid as the first hydraulic pump 4 is driven by the engine 1. The traveling hydraulic motor 10 is driven by hydraulic fluid discharged from the first hydraulic pump 4. The traveling hydraulic motor 10 moves the working vehicle 50 by driving the above-mentioned tires 55 to rotate. That is to say, the hydraulic drive mechanism 30 employs what is called a 1 pump 1 motor HST system.

The engine 1 is a diesel engine. Output torque generated at the engine 1 is conveyed to the second hydraulic pump 2, the charge pump 3, the first hydraulic pump 4 and the like. An engine rotation speed sensor 1a that detects actual rotation speed of the engine 1 is installed in the hydraulic drive mechanism 30. Further, a fuel injection device 1b is connected to the engine 1. The engine controller 12a described subsequently, controls the rotation speed and output torque (hereinafter "engine torque") of the engine 1 by controlling the fuel injection device 1b.

The first hydraulic pump 4 discharges hydraulic fluid as the first hydraulic pump 4 is driven by the engine 1. The first hydraulic pump 4 is a variable displacement type hydraulic pump. Hydraulic fluid discharged from the first hydraulic pump 4 passes the drive hydraulic circuit 20 and is delivered to the traveling hydraulic motor 10. Basically, the drive hydraulic circuit 20 includes a first drive circuit 20a and a second drive circuit 20b. As hydraulic fluid is supplied to the traveling hydraulic motor 10 from the first hydraulic pump 4 via the first drive circuit 20a the traveling hydraulic motor 10 is driven in one direction e.g. the forward direction). As hydraulic fluid is supplied to the traveling hydraulic motor 10 from the first hydraulic pump 4 via the second drive circuit 20b the traveling hydraulic motor 10 is driven in the other direction (e.g. the reverse direction).

A drive circuit pressure detection part 17 is installed in the drive hydraulic circuit 20. The drive circuit pressure detection part 17 detects the pressure of hydraulic fluid (hereinafter "drive circuit pressure") supplied to the traveling hydraulic motor 10 via the first drive circuit 20a or the second drive circuit 20b. Basically, the drive circuit pressure detection part 17 has a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure sensor 17a and the second drive circuit pressure sensor 17b send detection signals to the vehicle body controller 12. Further, an FR switching part 5 and pump displacement control cylinder 6 are connected to the first hydraulic pump 4 for controlling the direction of discharge from the first hydraulic pump 4.

The FR switching part 5 is an electromagnetic control valve that switches the direction of hydraulic fluid supplied to the pump displacement control cylinder 6 based on a control signal from the vehicle body controller 12. The FR switching part 5, by switching the direction in which hydraulic fluid is supplied to the pump displacement control cylinder 6, switches the direction of discharge from the first hydraulic pump 4. Basically, the FR switching part 5 switches the direction of discharge from the first hydraulic pump 4 between discharge to the first drive circuit 20*a* and discharge to the second drive circuit 20*b*. In this way the drive direction of the traveling hydraulic motor 10 is changed. The pump displacement control cylinder 6 is driven by hydraulic fluid supplied via a pump pilot circuit 32 and changes the tilting angle of the first hydraulic pump 4. Thus the pump displacement control cylinder 6 changes the displacement of the first hydraulic pump 4 (hereinafter "pump displacement").

A pilot pressure control valve 7 is arranged in the pump pilot circuit 32. The pilot pressure control valve 7 connects the pump displacement control cylinder 6 to any of the pump pilot circuit 32 and a hydraulic fluid tank. The pilot pressure control valve 7 is an electromagnetic control valve controlled based on control signals from the vehicle body controller 12. The pilot pressure control valve 7 adjusts the tilting angle of the first hydraulic pump 4 by controlling the pressure of hydraulic fluid inside the pump displacement control cylinder 6. In this way, the pilot pressure control valve 7 controls the pressure of hydraulic fluid inside the pump displacement control cylinder 6 (hereinafter "pump pilot pressure").

The pump pilot circuit 32 is connected to a charge circuit 33 and a hydraulic fluid tank via a cutoff valve 47. The pilot port of the cutoff valve 47 is connected to the first drive circuit 20*a* and the second drive circuit 20*b* via a shuttle valve 46. The shuttle valve 46 introduces whichever hydraulic pressure is greatest between the first drive circuit 20*a* and the second drive circuit 20*b* to the pilot port of the cutoff valve 47. That is to say, drive circuit pressure is applied to the pilot port of the cutoff valve 47. The cutoff valve 47 links the charge circuit 33 and the pump pilot circuit 32 when drive circuit pressure is below a predetermined cutoff pressure. In this way hydraulic fluid is supplied from the charge circuit 33 to the pump pilot circuit 32. When drive circuit pressure is above the predetermined cutoff pressure, the cutoff valve 47 links the pump pilot circuit 32 to a hydraulic fluid tank and releases hydraulic fluid of the pump pilot circuit 32 to the hydraulic fluid tank. In this way, hydraulic pressure of the pump pilot circuit 32 is lowered, in other words, by lowering pump pilot pressure pump displacement is decreased, suppressing a rise in drive circuit pressure.

The charge pump 3, driven by the engine 1, is a pump for supplying hydraulic fluid to the drive hydraulic circuit 20. The charge pump 3 is connected to the charge circuit 33. The charge pump 3 supplies hydraulic fluid to the pump pilot circuit 32 via the charge circuit 33. That is to say, the charge pump 3 is an example of a pilot hydraulic source for supplying hydraulic fluid for driving the pump displacement control cylinder 6. The charge circuit 33 is connected to the first drive circuit 20*a* via a first check valve 41. The first check valve 41 allows flow of hydraulic fluid from the charge circuit 33 to the first drive circuit 20*a* but restricts flow of hydraulic fluid from the first drive circuit 20*a* to the charge circuit 33. Further, the charge circuit 33 is connected to the second drive circuit 20*b* via a second check valve 42. The second check valve 42 allows flow of hydraulic fluid from the charge circuit 33 to the second drive circuit 20*b* but restricts flow of hydraulic fluid from the second drive circuit 20*b* to the charge circuit 33. Again, the charge circuit 33 is connected to the first drive circuit 20*a* via a first relief valve 43. The first relief valve 43 opens when the hydraulic pressure of the first drive circuit 20*a* is greater than a predetermined pressure. The charge circuit 33 is connected to the second drive circuit 20*b* via a second relief valve 44. The second relief valve 44 opens when the hydraulic pressure of the second drive circuit 20*b* is greater than a predetermined pressure. Further, the charge circuit 33 is connected to a hydraulic fluid tank via a low pressure relief valve 45. The low pressure relief valve 45 opens when the hydraulic pressure of the charge circuit 33 is greater than a predetermined relief pressure. In this way, drive circuit pressure is adjusted so as not to exceed the predetermined relief pressure. The predetermined relief pressure of the low pressure relief valve 45 is low in comparison to the relief pressure of the first relief valve 43 and the relief pressure of the second relief valve 44. Accordingly, when drive circuit pressure is lower than hydraulic pressure of the charge circuit 33, hydraulic fluid is supplied from the charge circuit 33 to the drive hydraulic circuit 20 via the first check valve 41 or the second check valve 42.

The second hydraulic pump 2 is driven by the engine 1. Hydraulic fluid discharged from the second hydraulic pump 2 is supplied to the lift cylinder 19 via the working implement hydraulic circuit 31, thereby driving the working implement 52. The discharge pressure of the second hydraulic pump 2 is detected by a discharge pressure sensor 39. The discharge pressure sensor 39 sends a detection signal to the vehicle body controller 12. A working implement control valve 18 is installed in the working implement hydraulic circuit 31. The working implement control valve 18 is driven in compliance with the degree of operation of a working implement operating member 23. The working implement control valve 18 controls the flow rate of hydraulic fluid supplied to the lift cylinder 19 in compliance with pilot pressure applied to the pilot port. Pilot pressure applied to the pilot port of the working implement control valve 18 is controlled by a pilot valve 23*a* of the working implement operating member 23. The pilot valve 23*a* applies pilot pressure to the pilot port of the working implement control valve 18 in compliance with the degree of operation of the working implement operating member 23. In this way, the lift cylinder 19 is controlled in compliance with the degree of operation of the working implement operating member 23. Pilot pressure applied to the pilot port of the working implement control valve 18 is detected by a PPC pressure sensor 21. The pressure of hydraulic fluid supplied to the lift cylinder 19 is detected by a boom pressure sensor 22. The PPC pressure sensor 21 and the boom pressure sensor 22 send detection signals to the vehicle body controller 12. A boom angle detection part 38 is attached to the lift cylinder 19. The boom angle detection part 38 detects the angle of the boom as described subsequently. The boom angle detection part 38 is a sensor for detecting the angle of rotation of the boom 53. Alternatively, it is also suitable for the boom angle detection part 38 to detect the degree of stroke of the cylinder 19 such that the rotation angle of the boom 53 can be calculated from that degree of stroke. The boom angle detection part 38 sends detection signals to the vehicle body controller 12. The bucket cylinder 26 is also controlled by a control valve in the same manner as the lift cylinder 19 however this valve is omitted from FIG. 2.

The traveling hydraulic motor 10 is a variable displacement type hydraulic motor. The traveling hydraulic motor 10 is driven by hydraulic fluid discharged from the first hydraulic pump 4, to generate drive force that facilitates travel. A motor cylinder and motor displacement control part 1*b* are installed in the traveling hydraulic motor 10. The motor cylinder 11*a* changes the tilting angle of the traveling hydraulic motor 10. The motor displacement control part 11*b* is an electromagnetic valve controlled based on control signals from the vehicle body controller 12. The motor displacement control part 11*b* controls the motor cylinder 11*a* based on control signals from the vehicle body controller 12. In this way the motor displacement control part 11*b* changes the displacement of the traveling hydraulic motor 10 (hereinafter "motor displacement"). The motor cylinder 11a and the motor displacement control part 11b are connected to a motor pilot circuit 34. The motor pilot circuit 34 is connected to the first drive circuit 20a via a check valve 48. The check valve 48' allows flow of hydraulic fluid from the first drive circuit 20a to the motor pilot circuit 34 hut restricts flow of hydraulic fluid from the motor pilot circuit 34 to the first drive circuit 20a. The motor pilot circuit 34 is connected to the second drive circuit 20b via a check valve 49. The check valve 49 allows flow of hydraulic fluid from the second drive circuit 20b to the motor pilot circuit 34 but restricts flow of hydraulic fluid from the motor pilot circuit 34 to the second drive circuit 20b. Through operation of the check valve 48 and the check valve 49, whichever hydraulic pressure is greatest between the first drive circuit 20a and the second drive circuit 20b, other words drive circuit pressure hydraulic fluid, is supplied to the motor pilot circuit 34. The motor displacement control part 11b switches the supply flow rate and direction of supply of hydraulic fluid to the motor cylinder 11a from the motor pilot circuit 34, based on control signals from the vehicle body controller 12. In this way, the vehicle body controller 12 can freely change motor displacement. Further, it enables the upper limit displacement and lower limit displacement of the traveling hydraulic motor 10 to be set as required.

A vehicle speed sensor 16 is installed on the hydraulic drive mechanism 30. The vehicle speed sensor 16 detects vehicle speed and sends detection signals to the vehicle body controller 12. The vehicle speed sensor 16 detects vehicle speed by for example, detecting the rotation speed of the tire drive shaft.

The working vehicle 50 includes an accelerator operation member 13a, a forward/reverse control member 14, an upper limit speed setting part 15 and an inching operation part 27.

The accelerator operation member 13a is a member that enables an operator to set a target rotation speed for the engine 1. The accelerator operation member 13a is for example, an accelerator pedal operated by the operator. The accelerator operation member 13a is connected to an accelerator operation sensor 13. The accelerator operation sensor 13 is comprised for example as a potentiometer. The accelerator operation sensor 13 sends detection signals showing the operation amount of the accelerator operation member 13a (hereinafter "degree of accelerator operation") to the engine controller 12a. The operator, by adjusting the degree of accelerator operation is able to control the rotation speed of the engine 1.

The forward/reverse control member 14 is operated by the operator switching between a forward travel position, a reverse travel position and a neutral position. The forward/reverse control member 14 sends detection signals showing the position of the forward/reverse control member 14 to the vehicle body controller 12. The operator, by operating the forward/reverse control member 14, is able to switch between a forward direction and reverse direction of travel of the working vehicle 50.

The upper limit speed setting part 15 is for example, a dial type switch. The upper limit speed setting part 15 is operated by the operator in order to set the target upper limit speed of upper limit speed variable control. Upper limit speed variable control is control that limits the upper limit of vehicle speed of the working vehicle 50 to a speed lower than maximum vehicle speed. The upper limit speed setting part 15 sends detection signals showing the selected target upper limit speed to the vehicle body controller 12.

The inching operation part 27 includes an inching operation member 27a and an inching operation sensor 27b. The inching operation member 27a is operated by an operator.

The inching operation member 27a is for example, a pedal. The inching operation member 27a includes both inching operation functions and braking operation functions as described subsequently. The inching operation sensor 27b detects the operation amount of the inching operation member 27a (hereinafter "degree of inching operation") and sends detection signals to the vehicle body controller 12. When the inching operation member 27a is operated the vehicle body controller 12 controls the pilot pressure control valve 7 based on the detection signals from the inching operation sensor 27b. The vehicle body controller 12 lowers hydraulic pressure of the pump pilot circuit 32 in compliance with the degree of inching operation of the inching operation member 27a. In this way, pump pilot pressure to the first hydraulic pump 4 is lowered and pump displacement of the first hydraulic pump 4 decreases. As a result, drive circuit pressure decreases and the rotation speed of the traveling hydraulic motor 10 decreases. The inching operation part 27 is used when for example the operator wishes to raise the rotation speed of the engine 1 while suppressing increase in travel speed. That is to say, if the rotation speed of the engine 1 is raised through operation of the accelerator operation member 13a, the hydraulic pressure of the pump pilot circuit 32 rises also. Here, by operating the inching operation member 27a rise in the hydraulic pressure of the pump pilot circuit 32 can be controlled. In this way increase in pump displacement is suppressed enabling arise in the rotation speed of the traveling hydraulic motor 10 to be suppressed. In other words, the inching operation member 27a is operated in order to lower vehicle speed without lowering engine rotation speed.

Further, a brake valve 28 is linked to the inching operation member 27a. The brake valve 28 controls supply of hydraulic fluid to a hydraulic brake device 29. The inching operation member 27a thus also operates as a member for operating the hydraulic brake device 29. Until the degree of inching operation of the inching operation member 27a reaches a predetermined amount, only the above described inching operation based on detection signals from the inching operation sensor 27b will be performed. When the degree of inching operation of the inching operation member 27a reaches the predetermined amount, brake valve 28 operation commences, thereby the hydraulic brake device 29 generates braking force. When the degree of inching operation of the inching operation member 27a is greater than or equal to the predetermined amount, braking force of the hydraulic brake device 29 is controlled in compliance with the degree of inching operation of the inching operation member 27a.

Figure 3:
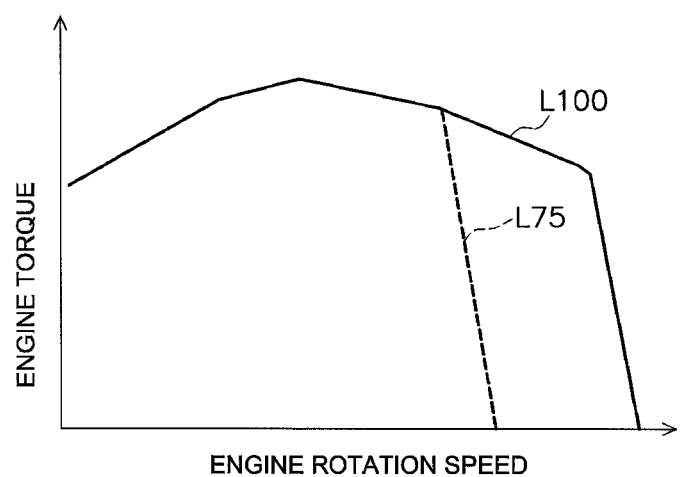
FIG. 3 shows the engine output torque line.

The engine controller 12a is an electronic control part including an arithmetic unit such as a CPU, and various kinds of memory. The engine controller 12a, controls the engine 1 so as to obtain the set target rotation speed. FIG. 3 shows the output torque line of the engine 1. The output torque line of the engine 1 shows the relationship between rotation speed of the engine 1 and the extent of maximum engine torque the engine 1 can output for each rotation speed. In FIG. 3 the solid line L100 shows the engine output torque line when the degree of accelerator operation is 100%. This engine output torque line is for example, equivalent to the rated value of the engine 1 or maximum power output. Degree of accelerator operation at 100% means the condition in which the accelerator operation member 13a is shifted to the maximum extent. Again, the short dashed line L75 shows the engine output torque line when the degree of accelerator operation is 75%. The engine controller 12a controls output of the engine 1 such that engine torque is below the engine output torque line. This engine 1 output control is for example performed by controlling the upper value of the quantity of fuel injected to the engine 1.

The vehicle body controller 12 is an electronic control part including an arithmetic unit such as a CPU, and various kinds of memory. The vehicle body controller 12 controls pump displacement and motor displacement by electronic control of each control valve based on detection signals from each detection part.

Figure 4:
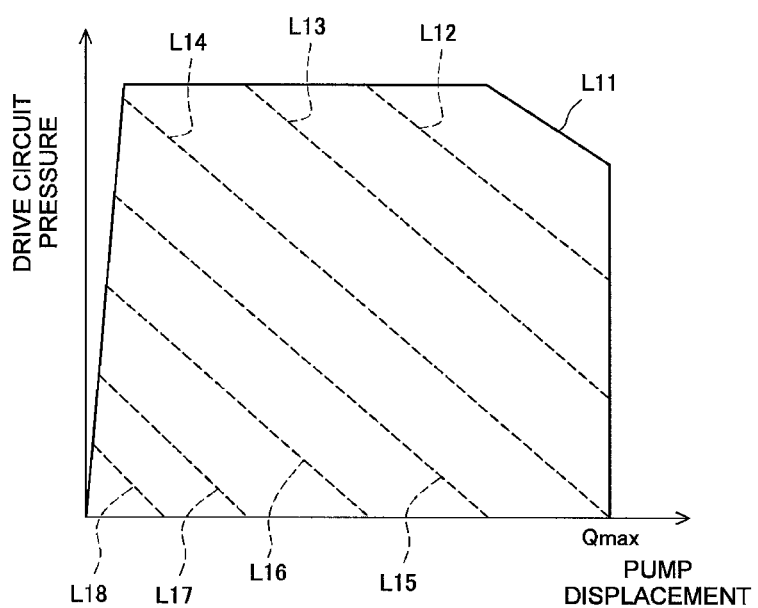
FIG. 4 shows an example of the pump displacement to drive circuit pressure characteristics.

Basically, the vehicle body controller 12 outputs an instruction signal to the pilot pressure control valve 7 based on engine rotation speed detected by the engine rotation speed sensor 1a. In this way, the relationship between pump displacement to drive circuit pressure is regulated. FIG. 4 shows an example of the pump displacement to drive circuit pressure characteristics. The pump displacement to drive circuit pressure characteristics show the relationship between pump displacement to drive circuit pressure. L11-L18 in FIG. 4 are lines that show the changing characteristics of pump displacement to drive circuit pressure in compliance with engine rotation speed. Basically, as the vehicle body controller 12 controls the flow rate of the pilot pressure control valve 7 based on the engine rotation speed, the pump displacement to drive circuit pressure characteristics changes as indicated by L11-L18. In this way, the extent of pump displacement is controlled in conformance with engine rotation speed and drive circuit pressure. Note that the inclination of the characteristics of pump displacement to drive circuit pressure is determined by the mechanical structure of the working vehicle 50. For example the inclination of the pump displacement to drive circuit pressure characteristics L11-L18 is determined by the mechanical properties of the first hydraulic pump 4.

The vehicle body controller 12 processes detection signals from the engine rotation speed sensor 1a and the drive circuit pressure detection part 17 and outputs motor displacement instruction signals to the motor displacement control part 11b. Here, the vehicle body controller 12 references motor displacement to drive circuit pressure characteristics stored in the vehicle body controller 12 and sets motor displacement from the value for engine rotation speed and the value for drive circuit pressure. The vehicle body controller 12 outputs instructions to change tilting angle in relation to motor displacement as set, to the motor displacement control part 11b.

Figure 5:
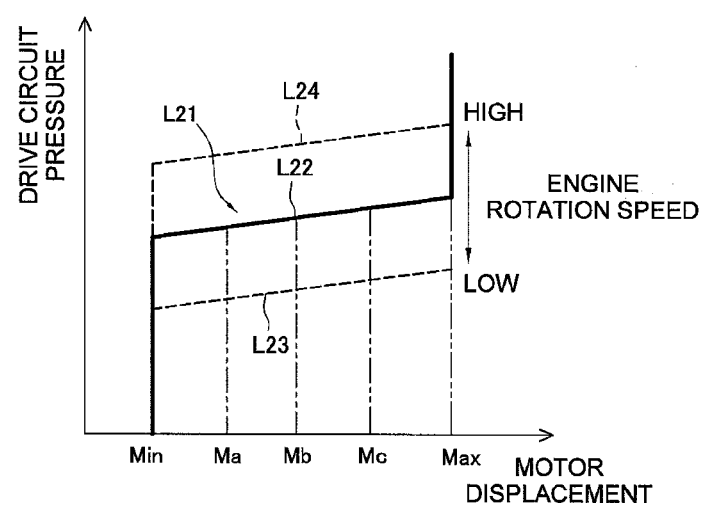
FIG. 5 shows an example of the motor displacement to drive circuit pressure characteristics.
Figure 6:
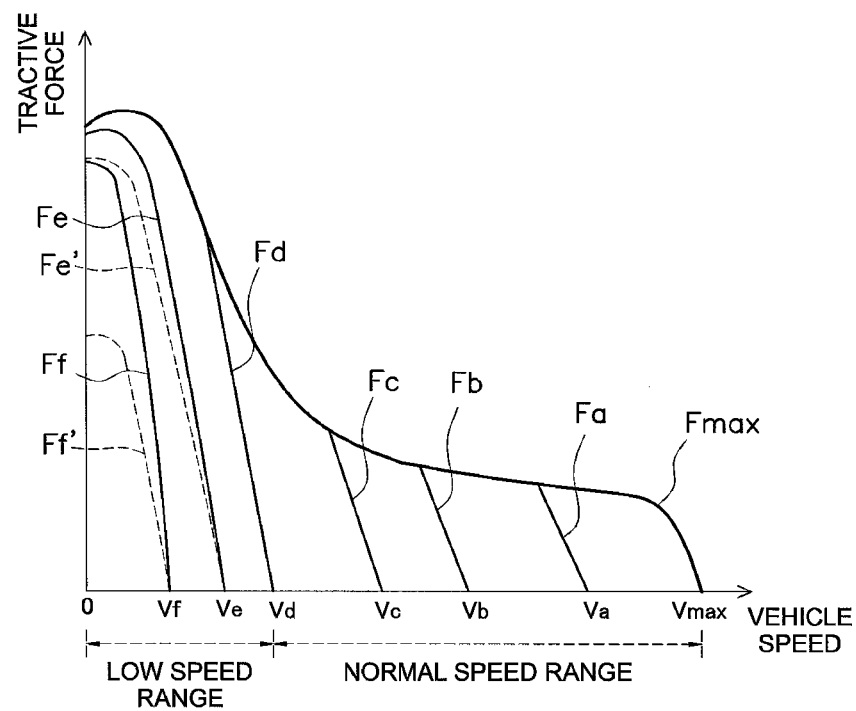
FIG. 6 shows an example of a graph of working vehicle speed and tractive force.

FIG. 5 shows an example of the motor displacement to drive circuit pressure characteristics. In FIG. 5 the solid line L21 is the line that defines motor displacement in relation to drive circuit pressure for conditions representing the values of engine rotation speed. Here, motor displacement corresponds to the tilting angle of the traveling hydraulic motor 10. Until drive circuit pressure falls below a certain value, tilting angle is minimum (Min). Thereafter tilting angle increases gradually as drive circuit pressure increases (the inclined portion of solid line L22). After the tilting angle reaches the maximum (Max), maximum tilting angle (Max) is maintained even though drive circuit pressure rises. The inclined portion L22 defines a target pressure of drive circuit pressure. In other words, the vehicle body controller 12 increases motor displacement if drive circuit pressure becomes greater than the target pressure. Again, if drive circuit pressure falls below the target pressure, the vehicle body controller 12 lowers motor displacement. The target pressure is defined in conformance with engine rotation speed. In other words, the inclined portion L22 in FIG. 5 is determined as rising or falling in compliance with the increase or decrease in engine rotation speed. Basically, the inclined portion L22 shows that if engine rotation speed is low, tilting angle increases from the condition in which drive circuit pressure is lower, controlled such that maximum tilting angle is reached with drive circuit pressure in a lower condition (in FIG. 5, the inclined dashed line L23 in the lower part). In the opposite case, if engine rotation speed is high, the minimum tilting angle (Min) is maintained until drive circuit pressure becomes higher, controlled such that maximum tilting angle (Max) is reached with drive circuit pressure in a higher condition (in FIG. 5, dashed line L24 in the upper part). In this way, as shown in FIG. 6, in the working vehicle 50 tractive force and vehicle speed change seamlessly without stages, enabling automatic speed change from zero to maximum speed with no shift gear operation. The inclined portion L22 in FIG. 5 is shown with the inclination emphasized to facilitate understanding, but actually should be almost horizontal. Accordingly, if drive circuit pressure reaches target pressure, motor displacement switches between a minimum value (minimum limiting value) and maximum value (maximum limiting value). However, when drive circuit pressure has reached target pressure, the instructed value is not changed immediately and a time delay occurs. This time delay is the reason the inclined portion L22 exists.

The vehicle body controller 12 implements upper limit speed variable control when the upper limit speed setting part 15 is operated. The vehicle body controller 12 has a speed range determination part 61 and an upper limit speed control part 62. The speed range determination part 61 determines whether the target upper limit speed set from the upper limit speed setting part 15 is within the normal speed range or within the low speed range.

When the target upper limit speed is within the normal speed range, the upper limit speed control part 62 changes the upper limit speed by changing the lower limit displacement of the traveling hydraulic motor 10 between minimum displacement Min and maximum displacement Max. For example, as shown in FIG. 5, the upper limit speed control part 62 outputs an instruction signal to the motor displacement control part 11b in order to change the lower limit displacement from Min to any of Ma, Mb or Mc. When the lower limit displacement is changed to Ma, the characteristics of vehicle speed to tractive force change as indicated by the line Fa in FIG. 6. In this way the upper limit of vehicle speed is changed to Va. That is to say, the upper limit vehicle speed is lowered in comparison to the maximum vehicle speed Vmax of the working vehicle 50. When the lower limit displacement is changed to Mb, the characteristics of vehicle speed to tractive force change as indicated by the line Fb. In this way, the upper limit of vehicle speed changes to speed Vb that is less than Va. When the lower limit displacement is changed to Mc, the characteristics of vehicle speed to tractive force change as indicated by the line Fe. In this way, the upper limit of vehicle speed changes to speed Vc that is less than Vb. Accordingly, when the target upper limit speed is set to Va from the upper limit speed setting part 15, the upper limit speed control part 62 controls the motor displacement control part 11b such that lower limit displacement becomes Ma. When the target upper limit speed is set to Vb from the upper limit speed setting part 15, the upper limit speed control part 62 controls the motor displacement control part 11b such that lower limit displacement becomes Mb. When the target upper limit speed is set to Vc from the upper limit speed setting part 15, the upper limit speed control part 62 controls the motor displacement control part 11b such that lower limit displacement becomes Mc.

When the lower limit displacement of the traveling hydraulic motor 10 is set to maximum displacement Max, motor displacement is set at maximum displacement Max. The characteristics of vehicle speed to tractive force when the lower limit displacement of the traveling hydraulic motor is set to maximum displacement Max are as indicated by the line Fd in FIG. 6. As shown in FIG. 6, the upper limit of vehicle speed when the lower limit displacement of the traveling hydraulic motor is set to maximum displacement Max is Vd. As shown in FIG. 6, the normal speed range is the range greater than or equal to Vd and less than or equal to Vmax. That is to say, the normal speed range is the range of speeds within which the upper limit of vehicle speed can be changed by changing the lower limit of motor displacement between minimum displacement Min and maximum displacement Max. On the other hand, the low speed range is the speed range less than the normal speed range. That is to say the low speed range is the range of speeds within which the upper limit of vehicle speed cannot be changed by changing the lower limit of motor displacement. Basically, the low speed range is the range of speed lower than vehicle speed Vd described above. Hereinafter vehicle speed Vd is referred to as threshold speed Vd.

Figure 7:
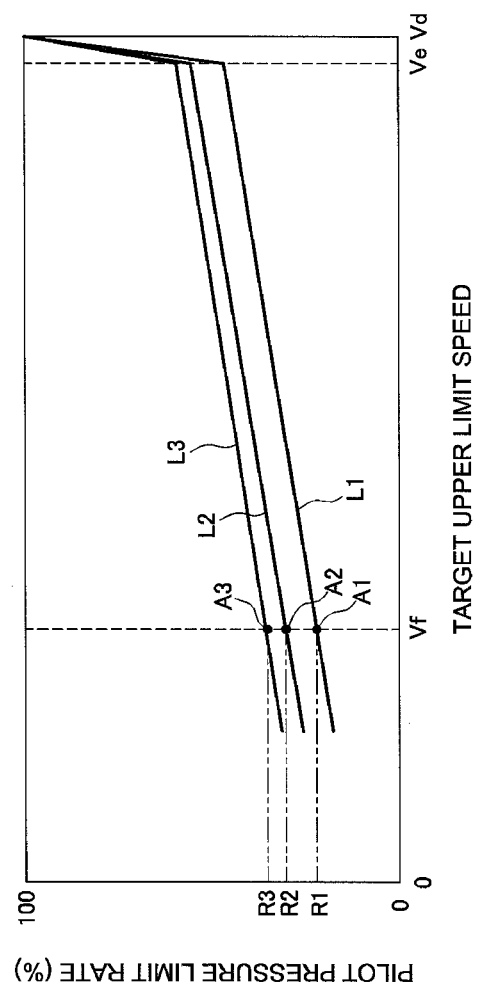
FIG. 7 shows an example of pilot pressure limit information.

When the target upper limit speed is within the low speed range, the upper limit speed control part 62 controls the upper limit of pump pilot pressure in conformance with a target upper limit speed via the pilot pressure control valve 7. FIG. 7 shows an example of pilot pressure limit information that indicates the relationship between target upper limit speed and drive circuit pressure and pilot pressure limit rate. The pilot pressure limit information is stored in the vehicle body controller 12. Pilot pressure limit information is stored in the vehicle body controller 12 in the form of a table or a map or the like. Pilot pressure limit rate corresponds to the upper limit of pump pilot pressure for upper limit speed variable control. Pump pilot pressure is set by controlling the pilot pressure control valve 7.

in FIG. 7 L1 shows the relationship between target upper limit speed and pilot pressure limit rate when drive circuit pressure is at P1. L2 shows the relationship between target upper limit speed and pilot pressure limit rate when drive circuit pressure is at P2 which is greater than P1. L3 shows the relationship between target upper limit speed and pilot pressure limit rate when drive circuit pressure is at P3 which is greater than P2. As shown in FIG. 7, with pilot pressure limit information, when drive circuit pressure is constant, pilot pressure limit rate increases as target upper limit speed increases. Accordingly, the upper limit speed control part 62 controls the pilot pressure control valve 7 such that the upper limit of pump pilot pressure increases as target upper limit speed increases. When target upper limit speed is greater than or equal to the threshold speed Vd above, pilot pressure limit rate is 100%. That is to say, when target upper limit speed is within the normal speed range, the upper limit speed control part 62 does not limit the upper limit of pump pilot pressure.

With pilot pressure limit information, when target upper limit speed is constant, pilot pressure limit rate increases as drive circuit pressure increases. For example, the pilot pressure limit rate when target upper limit speed is Vf moreover drive circuit pressure is at P1, is R1. The pilot pressure limit rate when target upper limit speed is Vf moreover drive circuit pressure is P2, is R2 which is greater than R1. The pilot pressure limit rate when target upper limit speed is Vf moreover drive circuit pressure is P3, is R3 which is greater than R2. Accordingly, when target upper limit speed is within the low speed range, the upper limit speed control part 62 controls the pilot pressure control valve 7 such that the upper limit of pump pilot pressure increases as drive circuit pressure increases.

Figure 8:
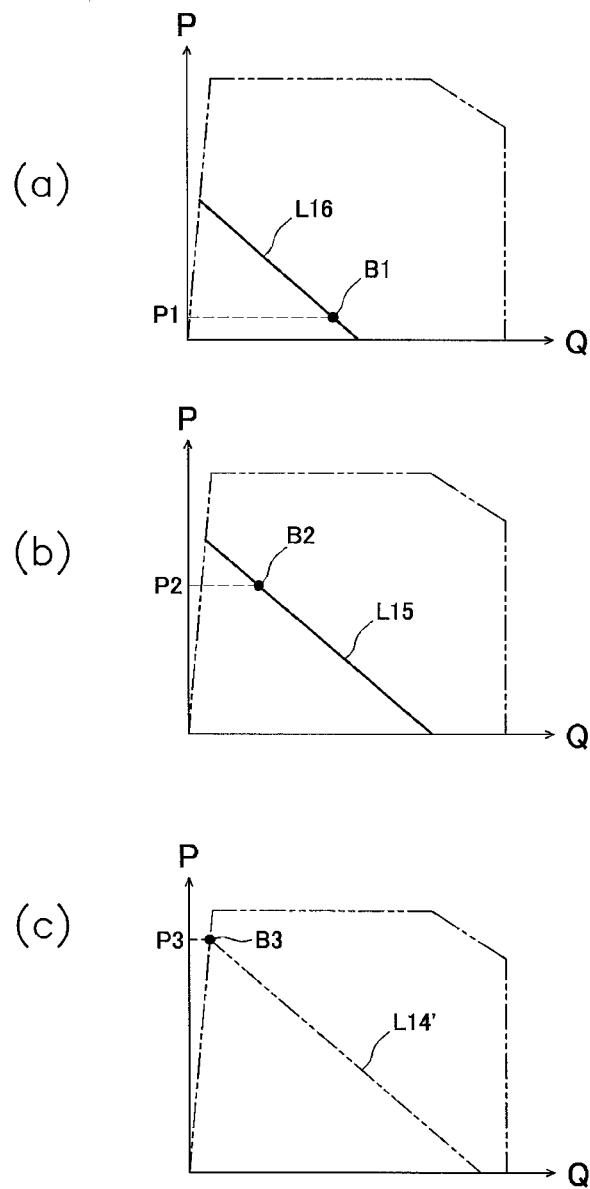
FIG. 8 shows change in characteristics of pump displacement to drive circuit pressure in conformance with drive circuit pressure.

FIG. 8 shows change in pump displacement to drive circuit pressure characteristics in conformance with drive circuit pressure. Basically, FIG. 8(*a*) shows the characteristics of pump displacement to drive circuit pressure when target upper limit speed is Vf moreover drive circuit pressure is at P1 (see A1 in FIG. 7), in other words, when pilot pressure limit rate is set to R1. At this time the pump displacement to drive circuit pressure characteristics indicated by L16 are obtained. Further drive circuit pressure is at P1. Accordingly, in FIG. 8 (*a*), the relationship between pump displacement and drive circuit pressure as shown by point B1 is obtained. FIG. 8 (*b*) shows the pump displacement to drive circuit pressure characteristics when target upper limit speed is Vf moreover drive circuit pressure is at P2 (see A2 in FIG. 7), that is to say, when the pilot pressure limit rate is set to R2. At this time the pump displacement to drive circuit pressure characteristics indicated by L15 are obtained. Further drive circuit pressure is at P2. Accordingly, in FIG. 8 (*b*), the relationship between pump displacement and drive circuit pressure as shown by point B2 is obtained. FIG. 8 (*c*) shows the pump displacement to drive circuit pressure characteristics when target upper limit speed is Vf moreover drive circuit pressure is at P3 (see A3 in FIG. 7), that is to say, when the pilot pressure limit rate is set to R3. At this time the pump displacement to drive circuit pressure characteristics indicated by L14' are obtained. Further drive circuit pressure is at P3. Accordingly, in FIG. 8 (*c*), the relationship between pump displacement and drive circuit pressure as shown by point B3 is obtained.

Figure 9:
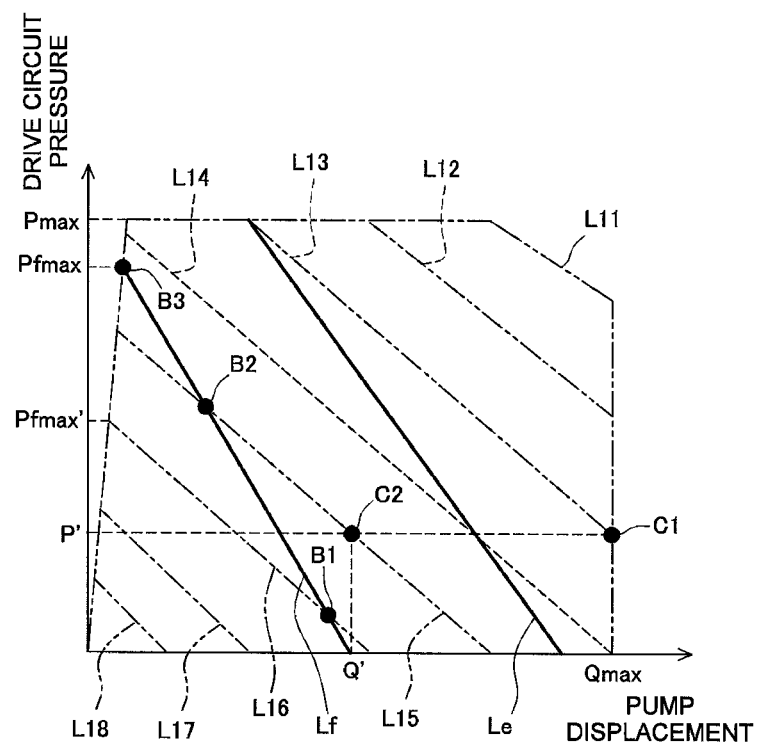
FIG. 9 shows second pump displacement to drive circuit pressure characteristics.

If the relationships of pump displacement to drive circuit pressure when the pilot pressure limit rate is increased in conformance with increase in drive circuit pressure as indicated by B1, B2 and B3 shown in FIG. 8 are overlaid, the result is the pump displacement to drive circuit pressure characteristics indicated by Lf in FIG. 9. In the same way, when the target upper limit speed is at Ve, the relationship of pump displacement to drive circuit pressure when the pilot pressure limit rate is increased in conformance with the increase in drive circuit pressure is as indicated by Le in FIG. 9. The relationships of pump displacement to drive circuit pressure obtained through increasing the pilot pressure limit rate in conformance with increase in drive circuit pressure indicated by Le, Lf in FIG. 9 are called second pump displacement to drive circuit pressure characteristics. Further, the characteristics of pump displacement to drive circuit pressure obtained with pump pilot pressure at the respectively fixed levels indicated by L11-L18 as described above, are called first pump displacement to drive circuit pressure characteristics. Accordingly, when the upper limit of pump pilot pressure is fixed at a predetermined pilot pressure value, what constitutes pump displacement and drive circuit pressure change in the upper limit set by first pump displacement to drive circuit pressure characteristics in conformance with predetermined pilot pressure values. As described above, the inclination of first pump displacement to drive circuit pressure characteristics L11-L18 is determined by the mechanical structure of the working vehicle 50. As shown in FIG. 9 the inclination of the second pump displacement to drive circuit pressure characteristics Le, Lf are more acute than the inclination of first pump displacement to drive circuit pressure characteristics L11-L18. That is to say, the absolute values of the ratio of change of drive circuit pressure in relation to pump displacement for the second pump displacement to drive circuit pressure characteristics is greater than the ratio of change of drive circuit pressure in relation to pump displacement for the first pump displacement to drive circuit pressure characteristics. Accordingly, decrease in pump displacement when drive circuit pressure rises can be prevented.

Note that when the target upper limit speed is within the low speed range, the upper limit speed control part 62 sets the value of the upper limit of pump pilot pressure lower than a predetermined first pilot pressure. The first pilot pressure is that which obtains the first pump displacement to drive circuit pressure characteristics, at which pump displacement when drive circuit pressure is at pressure P' equivalent to the load when traveling on a level surface, is at hydraulic pump maximum displacement Qmax, and if drive circuit pressure becomes greater than P', pump displacement becomes smaller than hydraulic pump maximum displacement Qmax. That is to say, first pilot pressure is pump pilot pressure that gives first pump displacement to pilot circuit pressure characteristics L13 shown in FIG. 9. If the upper limit of pump pilot pressure is lowered in a range greater than first pilot pressure, the upper limit of first pump displacement to drive circuit pressure characteristics changes from L11 to L12 for example. At this time, as shown in FIG. 9, when drive circuit pressure is at P', even though first pump displacement to drive circuit pressure characteristics change from L11 to L12, the upper limit of pump displacement does not change at maximum displacement max of first hydraulic pump 4 (see point C1 in FIG. 9). On the other hand, if the upper limit of pump pilot pressure is set at a value smaller than first pilot pressure as above, the upper limit of first pump displacement to drive circuit pressure characteristics changes from L12 to L15 for example. At this time, if drive circuit pressure is at P', the upper limit of pump displacement lowers to Q' (see point C2 in FIG. 9). Thus the upper limit of vehicle speed can be made to reduce. Note that pressure P' equivalent to the load when traveling on a level surface, is for example a value of approximately 5 MPa.

Figure 10:
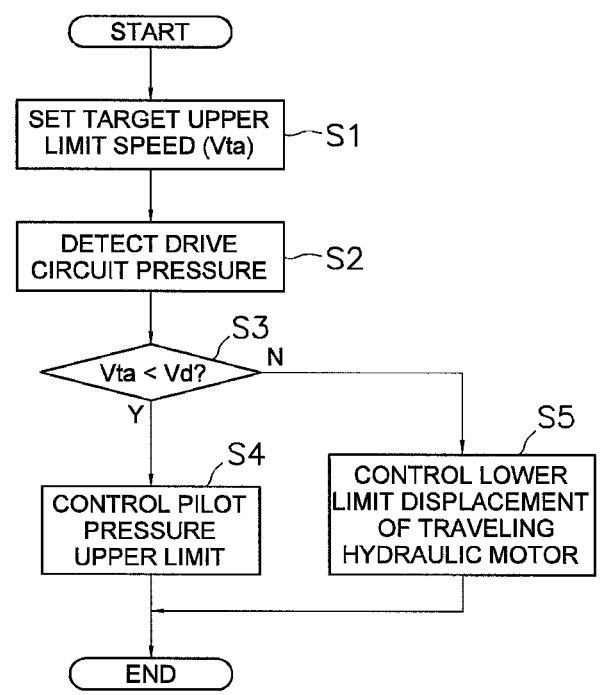
FIG. 10 is a flowchart showing the processes of upper limit speed variable control.

FIG. 10 is a flowchart showing the processes of upper limit speed variable control. Firstly, at step S1, the upper limit speed control part 15 sets the target upper limit speed. The target upper limit speed is set from the upper limit speed control part 15 by the operator. The upper limit speed control part 15 sends detection signals showing the target upper limit speed set by the operator to the vehicle body controller 12.

At step S2, the drive circuit pressure detection part 17 detects drive circuit pressure. The drive circuit pressure detection part 17 sends detection signals showing the detected drive circuit pressure to the vehicle body controller 12.

At step S3, the speed range detection part 61 determines whether the target upper limit speed Vta set by the upper limit speed control part 15 is smaller than the above described threshold speed Vd. That is to say, the speed range detection part 61 determines whether the target upper limit speed Vta is within the normal speed range or within the low speed range. When the target upper limit speed Vta is less than the above described threshold speed Vd, step S4 is implemented. In other words, when the target upper limit speed is within the low speed range, step S4 is proceeded to.

At step S4, the upper limit speed control part 62 controls the upper limit of pump pilot pressure as described above. Note that motor displacement is fixed to Max. Basically, the upper limit speed control part 62 calculates the pilot pressure limit rate from the target upper limit speed and drive circuit pressure, based on the pilot pressure limit information described above. Then the upper limit speed control part 62 sends an instruction signal corresponding to the pilot pressure limit rate to the pilot pressure control valve 7. In this way the upper limit speed control part 62 changes the upper limit of pup pilot pressure in conformance with drive circuit pressure such that pump displacement and drive circuit pressure change in accordance with the second pump displacement to drive circuit pressure characteristics described above.

For example, if Vf is set as target upper limit speed, the upper limit speed control part 62 changes the upper limit of pump pilot pressure such that pump displacement and drive circuit pressure change in accordance with the second pump displacement to drive circuit pressure characteristics Lf in FIG. 9. In this way, the vehicle speed to tractive power characteristics Ff shown in FIG. 6 are obtained. That is to say, the upper limit of vehicle speed is limited to the target upper limit vehicle speed Vf. Further, if Ve is set as target upper limit speed, the upper limit speed control part 62 changes the upper limit of pump pilot pressure such that pump displacement and drive circuit pressure change in accordance with the second pump displacement to drive circuit pressure characteristics Le in FIG. 9. In this way, the vehicle speed to tractive power characteristics Fe shown in FIG. 9 are obtained. That is to say, the upper limit of vehicle speed is limited to the target upper limit vehicle speed Ve.

At step S3, if the target upper limit speed is not less than the threshold speed Vd described above, step S5 is implemented. That is to say, when the target upper limit speed is in the normal speed range step S5 is proceeded to. At step S5 control of the lower limit of vehicle displacement of the traveling hydraulic motor 10 is performed as described above. In this way the vehicle speed to tractive force characteristics Va, Vb, Vc shown in FIG. 6 can be obtained in conformance with the target upper limit speed as set. In other words, the upper limit of vehicle speed is limited to the target upper limit vehicle speed Va, Vb, Vc.

With the working vehicle related to this embodiment of the present invention, the upper limit speed control part 62 controls the upper limit of pump pilot pressure in conformance with the target upper limit speed through the pilot pressure control valve 7, when target upper limit speed is within the low speed range. In this way even for the low speed range in which the upper limit of vehicle speed cannot be changed by control of motor displacement, the upper limit of vehicle speed can be changed. Accordingly, limits on the upper limit of vehicle speed can easily be changed in the low speed range without operation of the inching pedal 27a as in the case of a conventional working vehicle. Again, when the target upper limit speed is within the low speed range, the upper limit speed control part 62 controls the pilot pressure control valve 7 such that the upper limit of pump pilot pressure increases as drive circuit pressure increases. Thus in comparison to the case in which the upper limit of pump pilot pressure is fixed at a predetermined value in relation to a predetermined target upper limit speed, a decrease in drive circuit pressure can be prevented. Accordingly, a decrease in tractive force during upper limit speed variable control in the low speed range can be prevented.

For example, if the upper limit of pump pilot pressure is fixed at a predetermined value defining the first pump displacement to drive circuit pressure characteristics L16 in FIG. 9, the upper limit of drive circuit pressure becomes Pfmax'. Here, drive circuit pressure becomes extremely small in comparison to maximum drive circuit pressure Pmax corresponding to relief pressure of the low pressure relief valve 45. In this case, tractive force decreases considerably as shown by vehicle speed to tractive force characteristics Ff' in FIG. 6. In contrast to this, when the upper limit of pump pilot pressure is controlled such as to obtain the second pump displacement to drive circuit pressure characteristics Lf in FIG. 9, the upper limit of drive circuit pressure becomes Pfmax which is greater than Pfmax'. In this case, as shown by vehicle speed to tractive force characteristics Ff in FIG. 6, decrease in tractive force can be prevented.

With the working vehicle related to this embodiment of the present invention when the target upper limit speed is within the normal speed range, the upper limit speed control part 62 sets the pilot pressure limit rate at 100%. That is to say, the upper limit speed control part 62 opens the pilot pressure control valve 7 to the full extent of the upper limit thereof. In this way, upper limit speed variable control can be performed without affecting adjustment to vehicle speed or traveling load from the accelerator operation member 13a or the inching operation member 27a.

Although the invention has been described above by reference to an embodiment thereof, the invention is not limited to the embodiment described above. It is therefore understood that numerous modifications and variations can be devised without departing from the scope of the invention.

The above embodiment has been described with reference to an example of a wheel loader as the working vehicle, however it is also suitable for an HST to be mounted on a different kind of working vehicle.

The description of the above embodiment includes an example of a working vehicle 50 mounting an HST system of one pump one motor including a single hydraulic pump and a traveling hydraulic motor 10. The invention is however, not limited to the embodiment described above. For example, it is also suitable for the present invention to be applied to a wheel loader mounting an HST system of one pump two motors, including a single hydraulic pump and two traveling hydraulic motors.

In the above embodiment the inching operation member 27a is a brake pedal, however it is also suitable for the inching operation member to be provided as a member other than a brake pedal. Alternatively, the inching operation member 27a can be omitted.

In the case of the above described embodiment of the present invention, Ve and Vf are provided as examples of target upper limit speed in the low speed range, however the number of target upper limit speeds within the low speed range that can be set by the upper limit speed setting part 15 is not limited to two. It is also suitable for the upper limit speed setting part 15 to be able to set three or more target upper limit speeds in the low speed range. Alternatively, it is suitable for the upper limit speed setting part 15 to be able to set only one target upper limit speed in the low speed range. Again, it is suitable for the upper limit speed setting part 15 to be able to set any speeds as target upper limit speeds in the low speed range. In the case of the above described embodiment of the present invention Va, Vb, Vc and Vd are provided as examples of target upper limit speed in the normal speed range, however the number of target upper limit speeds in the normal speed range that can be set by the upper limit speed control part 15 is not limited to four. It is suitable for the upper limit speed setting part 15 to be able to set five or more target upper limit speeds for the normal speed range. Again, it is suitable for the upper limit speed setting part 15 to be able to set three or less target upper limit speeds for the normal speed range. Alternatively, it is suitable for the upper limit speed control part 15 to be able to set any speeds as target upper limit speeds in the normal speed range.

The illustrated embodiment includes a working vehicle and method for controlling a working vehicle that enables the upper limit of vehicle speed to be limited with ease within the low speed range, while suppressing decrease in tractive force.

The invention claimed is:

1. A working vehicle comprising:
    an engine;
    a hydraulic pump configured to be driven by the engine;
    a traveling hydraulic motor configured to be driven by hydraulic fluid discharged from the hydraulic pump;
    a pump displacement control cylinder configured to change a pump displacement of the hydraulic pump by changing a tilting angle of the hydraulic pump;
    a pilot hydraulic source configured to supply hydraulic fluid for driving the pump displacement control cylinder;
    a pilot pressure control valve configured to control a pilot pressure that is a pressure of the hydraulic fluid supplied to the pump displacement control cylinder from the pilot hydraulic source;
    a motor displacement control part configured to change a motor displacement of the traveling hydraulic motor by changing a tilting angle of the traveling hydraulic motor;
    a drive circuit pressure detection part configured to detect a drive circuit pressure that is a pressure of the hydraulic fluid supplied to the traveling hydraulic motor;
    an upper limit speed setting part configured to set a target upper limit speed for an upper limit variable speed control that limits an upper limit of a vehicle speed to a speed lower than a maximum vehicle speed;
    a speed range determination part configured to determine whether the target upper limit speed is within a normal speed range in which the upper limit of the vehicle speed is changed by changing a lower limit of the motor displacement between a minimum displacement and a maximum displacement, or within a low speed range that is lower than the normal speed range; and
    an upper limit speed control part configured to control the lower limit of the motor displacement in conformance with the target upper limit speed through the motor displacement control part when the target upper limit speed is within the normal speed range and controls to control an upper limit of the pilot pressure in conformance with the target upper limit speed through the pilot pressure control valve when the target upper limit speed is within the low speed range, wherein
    when the target upper limit speed is within the low speed range, the upper limit speed control part is configured to control the pilot pressure control valve such that the upper limit of the pilot pressure increases as the drive circuit pressure increases.

2. The working vehicle according to claim 1, wherein the upper limit speed control part is configured to control the pilot pressure control valve such that the upper limit of the pilot pressure increases as the target upper limit speed increases.

3. The working vehicle according to claim 1, wherein the upper limit speed control part is configured not to limit the upper limit of the pilot pressure in conformance with the target upper limit speed when the target upper limit speed is within the normal speed range.

4. The working vehicle according to claim 1, wherein when the pilot pressure is fixed at a predetermined pilot pressure value, the pump displacement and the drive circuit pressure change in accordance with first pump displacement to drive circuit pressure characteristics that define a relationship of the pump displacement to the drive circuit pressure,
    when the target upper limit speed is within the low speed range, the upper limit speed control part is configured to change the upper limit of the pilot pressure in conformance with the drive circuit pressure, such that the pump displacement and the drive circuit pressure change in accordance with second pump displacement to drive circuit pressure characteristics, and
    an absolute value of a ratio of change of the drive circuit pressure in relation to the pump displacement for the second pump displacement to drive circuit pressure characteristics is greater than an absolute value of a ratio of change of the drive circuit pressure in relation to the pump displacement for the first pump displacement to drive circuit pressure characteristics.

5. The working vehicle according to claim 4, wherein when the target upper limit speed is within the low speed range, the upper limit speed control part is configured to set the upper limit of the pilot pressure to a value smaller than a predetermined first pilot pressure, and the first pilot pressure is the pilot pressure at which the pump displacement when the drive circuit pressure is at a pressure of load equivalent when traveling on a level surface reaches a maximum displacement of the hydraulic pump, and at which the first pump displacement to drive circuit pressure characteristics is obtained in which when the drive circuit pressure becomes greater than the pressure of load equivalent when traveling on a level surface, the pump displacement becomes less than the maximum displacement of the hydraulic pump.

6. A method for controlling a working vehicle including an engine, a hydraulic pump driven by the engine, a traveling hydraulic motor driven by hydraulic fluid discharged from the hydraulic pump, a pump displacement control cylinder configured to change a pump displacement of the hydraulic pump by changing a tilting angle of the hydraulic pump, a pilot hydraulic source configured to supply hydraulic fluid for driving the pump displacement control cylinder, a pilot pressure control valve configured to control a pilot pressure that is a pressure of the hydraulic fluid supplied to the pump displacement control cylinder from the pilot hydraulic source, a motor displacement control part configured to change a motor displacement of the traveling hydraulic motor by changing a tilting angle of the traveling hydraulic motor, a drive circuit pressure detection part configured to detect a drive circuit pressure that is a pressure of the hydraulic fluid supplied to the traveling hydraulic motor, an upper limit speed setting part configured to set a target upper limit speed for an upper limit variable speed control that limits an upper limit of a vehicle speed to a speed lower than a maximum vehicle speed, the method comprising:

determining whether the target upper limit speed is within a normal speed range in which the upper limit of the vehicle speed is changed by changing a lower limit of the motor displacement between a minimum displacement and a maximum displacement, or within a low speed range, that is a range of speed lower than the normal speed range;

controlling the lower limit of motor displacement in conformance with the target upper limit speed via the motor displacement control part when the target upper limit speed is within the normal speed range; and controlling an upper limit of the pilot pressure in conformance with the target upper limit speed via the pilot pressure control valve when the target upper limit speed is within the low speed range and controlling the pilot pressure control valve such that the upper limit of the pilot pressure increases as the drive circuit pressure increases.

* * * * *